United States Patent [19]

Zebroski

[11] 4,227,967
[45] Oct. 14, 1980

[54] METHOD AND APPARATUS FOR REDUCING THE POWER LEVEL IN A NUCLEAR REACTOR DURING TEMPERATURE TRANSIENT

[75] Inventor: Edwin L. Zebroski, Los Altos, Calif.

[73] Assignee: Electric Power Research Institute, Inc., Palo Alto, Calif.

[21] Appl. No.: 803,138

[22] Filed: Jun. 3, 1977

[51] Int. Cl.² .............................................. G21C 7/00
[52] U.S. Cl. ............................... 176/36 R; 176/86 R
[58] Field of Search .................. 176/36 R, 36 C, 36 S, 176/35, 33, 34, 86 R, 93 BP, DIG. 5, 27–29

[56] References Cited

U.S. PATENT DOCUMENTS

| | | | |
|---|---|---|---|
| 2,904,487 | 9/1959 | Dickson | 176/36 |
| 3,212,981 | 10/1965 | Tollet et al. | 176/36 |
| 3,661,708 | 5/1972 | Friedland | 176/22 |
| 3,933,581 | 1/1976 | McKeehan et al. | 176/36 |
| 3,976,540 | 8/1976 | Sowa | 176/36 |
| 3,992,257 | 11/1976 | Van Erp | 176/36 |
| 4,032,401 | 6/1977 | Froelich et al. | 176/86 |

OTHER PUBLICATIONS

ANL-CT-76-2, Josephson et al., 8/75, pp. 2–8.
KAPL-M-LBV-7, Vandenberg, 9/55, pp. 3–5.

Primary Examiner—Harvey E. Behrend
Attorney, Agent, or Firm—Flehr, Hohbach, Test

[57] ABSTRACT

Apparatus for reducing the power level in a nuclear reactor during a transient increase in temperature of the primary coolant. The apparatus includes a neutron absorber and a thermally elongatable member adapted for moving the absorber into closer proximity with the core. The elongatable member is sensitive to the temperature of the primary coolant and moves the absorber by its thermal elongation. The elongatable member includes means for amplifying its thermal elongation so that the motion of the absorber member is amplified.

5 Claims, 5 Drawing Figures

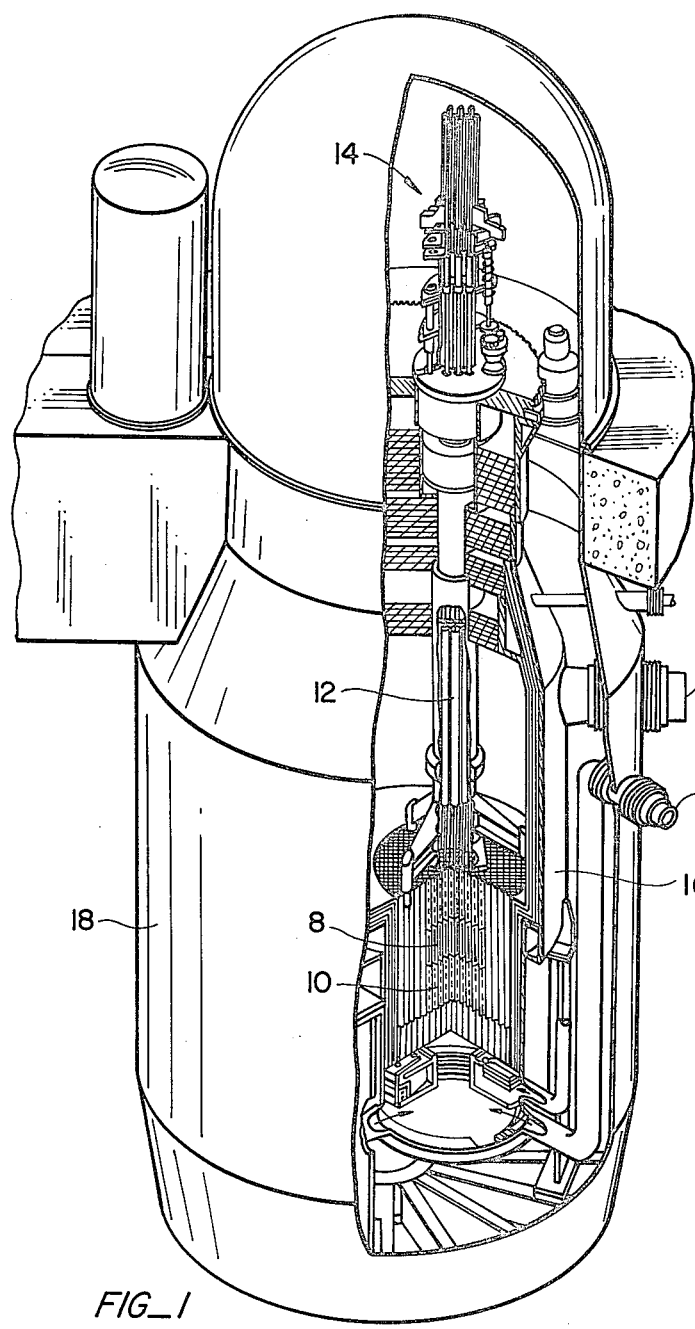
FIG_1
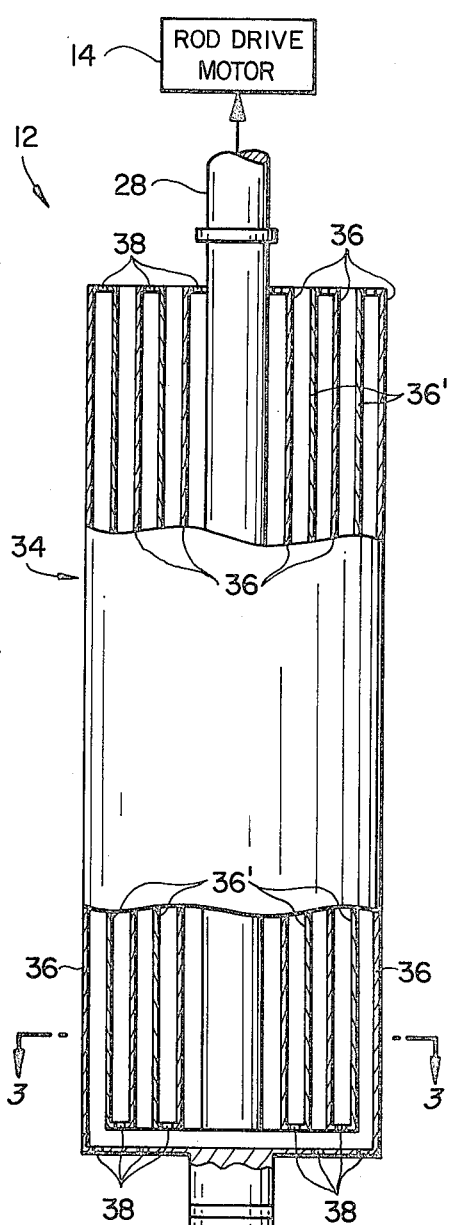
FIG_2
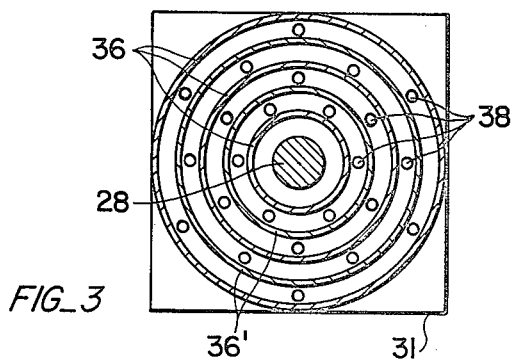
FIG_3

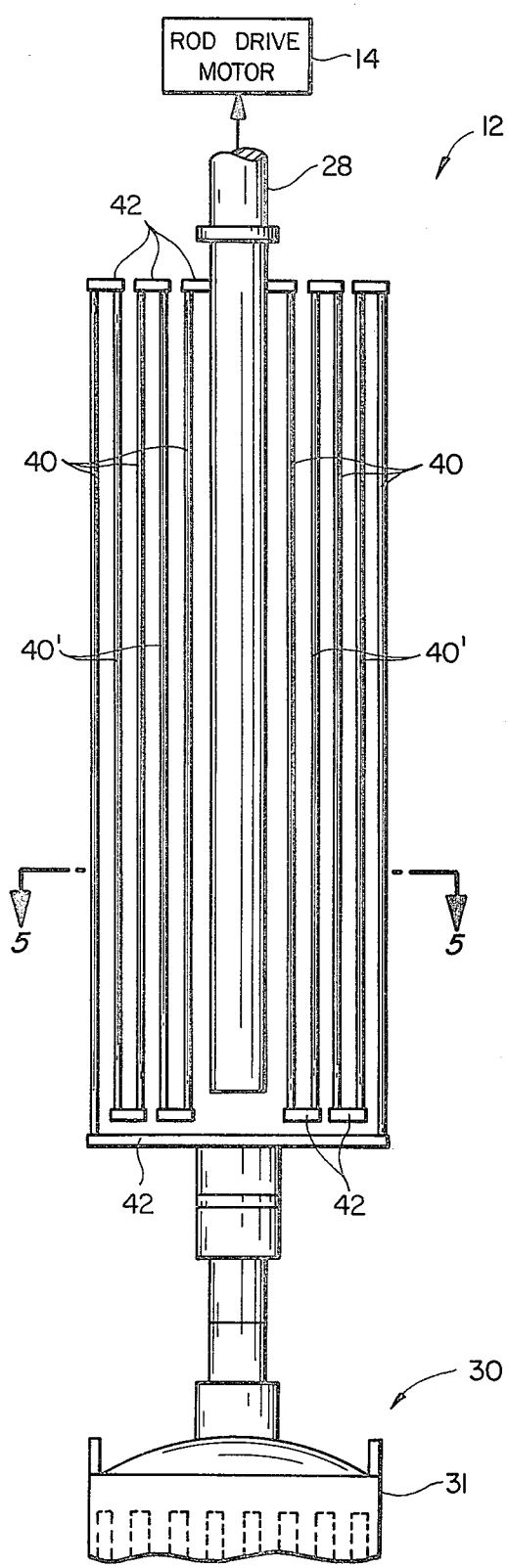
FIG_4
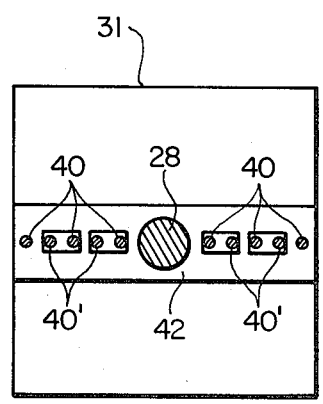
FIG_5

METHOD AND APPARATUS FOR REDUCING THE POWER LEVEL IN A NUCLEAR REACTOR DURING TEMPERATURE TRANSIENT

BACKGROUND OF THE INVENTION

1. Field of the Invention

The present invention generally relates to nuclear reactors and, in particular, to devices for moving control rods with respect to reactor cores.

2. Description of the Prior Art

One of the most serious accidents that can occur to a nuclear power plant is a loss of coolant followed by the failure of the control system to accomplish a rapid shutdown of the reactor. A loss of coolant flow can occur from either the rupture of piping or the stoppage of one or more of the coolant circulating pumps. This type of accident is especially serious because the heat generated in the reactor cannot be carried off. If the reactor continues to generate heat, then tremendous pressures are built up in the coolant system. In addition, this heat generation, if it is not terminated by a scram, could melt down a majority of the core of the reactor.

In the reactors using liquid sodium for primary coolant, there is a special problem caused by a partial or total loss of sodium flow if a reactor scram does not follow promptly. In the present design of liquid metal fast breeder reactors there is a gain in reactivity called a positive sodium void coefficient that occurs when sodium flow is interrupted. The sodium temperature may increase to its boiling point, whereupon "voids" of sodium vapor are formed, resulting in increased reactivity, power, more boiling, and the possibility of serious consequences. This gain in reactivity occurs because although the neutron absorption effect of sodium is small, it is not zero. Any loss of of sodium from the core causes a shift in the neutron absorption spectrum and increases the number of neutrons. This shift, in turn, increases the probability of neutron capture by the fissionable atoms in the fuel.

Although the reactor control systems and scram circuits in use today are quite reliable, there is a continuing effort in the nuclear reactor industry to make reactor control systems absolutely foolproof. No one in this industry is entirely satisfied with the present state of the art. There is a continuous emphasis on making reactor shutdown systems as reliable as possible. These efforts include minimizing the number of moving mechanical parts and designing the components to be independent of both electrical failures and sensor failures.

SUMMARY OF THE INVENTION

The primary object of the present invention is to overcome the limitations and disadvantages of the prior art.

An additional object of the present invention is to prevent damage to a reactor and its surroundings during a temperature excursion and especially during a loss of flow accident.

A further object of the present invention is to develop a simple system for reducing the reactor power level that has a minimum number of moving mechanical parts and is independent of both electrical power failure and sensor failure.

Another object of the present invention is to reduce the power level in a nuclear reactor in a manner that is directly proportional to the increase in temperature of the primary coolant.

Still another object of the present invention is to provide a system that produces a negative temperature coefficient of reactivity in a liquid metal fast breeder reactor. Such reactor typically has a temperature coefficient of reactivity that is nearly zero or positive.

In addition, a further object of the present invention is to reduce the power level in a nuclear reactor after a loss of flow accident to less than 15 percent of full power without the intervention of any sensing devices or control rod actuators.

These and other objects are achieved by an apparatus for reducing the power level in a nuclear reactor that includes a neutron absorber and a thermally elongatable member. The elongatable member is adapted for mounting on a rod drive shaft or on the vessel containing the reactor core. When so attached the elongatable member moves the absorber relative to the core and is sensitive to the temperature of the primary coolant. The elongatable member moves the absorber by its thermal elongation into closer proximity with the core as the temperature of the primary coolant increases. The elongatable member also includes means for amplifying its thermal elongation so that the motion of the absorber into the core is amplified.

Additional objects and features of the invention will appear from the foregoing description in which the preferred embodiments have been set forth in detail in conjunction with the accompanying drawings.

BRIEF DESCRIPTION OF THE DRAWINGS

FIG. 1 is an orthogonal view of a liquid metal fast breeder reactor according to the present invention.

FIG. 2 is a side elevational view, partially cut away, of a control rod of the reactor of FIG. 1 according to the present invention.

FIG. 3 is a top plan view, in section, taken along line 3—3 of FIG. 2 illustrating the interior of a portion of the control rod of FIG. 2.

FIG. 4 is a side elevational view, partially cut away, of a control rod of the reactor of FIG. 1 according to an alternative embodiment of the present invention.

FIG. 5 is a top plan view, in section, taken along line 5—5 of FIG. 4.

DESCRIPTION OF THE PREFERRED EMBODIMENTS

FIG. 1 illustrates a liquid metal fast breeder reactor of known construction. This reactor includes a core area 8 containing a plurality of fuel elements 10. The power generated by the reactor is regulated by a series of control rods 12 that are raised and lowered with respect to the core by the rod drive mechanisms 14. The core of the reactor is contained within a vessel 16 and the entire nuclear reactor is housed within a primary shield 18. The reactor uses partially enriched uranium (U-235) or plutonium (Pu-239) for fuel and the primary coolant is typically sodium at atmospheric pressure.

The reactor of FIG. 1 is cooled by a flow of liquid sodium that enters the reactor vessel through an inlet nozzle 20. The liquid sodium thereafter flows to a plenum located beneath the fuel elements 10. Thereafter, the primary coolant flows upward through the core where the heat generated by the fission reaction is transferred to the primary coolant. Next, the coolant flows out of the vessel through an outlet nozzle 22. The heat in the primary coolant is transferred to either a secondary heat exchanger (not shown) or to a steam generator.

In this secondary heat exchanger steam is generated for the production of electrical power.

FIG. 2 illustrates a portion of a control rod 12 that is moved into and out of the reactor core 8 to control the power level. The control rod includes a rod drive shaft 28 that is connected to a rod drive mechanism 14, FIG. 1. The rod drive mechanism is an electro-mechanical motor which precisely moves the control rod into and out of the core. The rod drive mechanism also can release the rod drive shaft so that the control rod can be rapidly inserted into the core in order to scram the reactor.

The control rod 12, FIG. 2, has an absorber 30 for absorbing neutrons in the reactor. The absorber includes a can 31 fabricated from stainless steel sheet stock that forms a conduit through which the sodium flows. The can also forms a housing for a plurality of elongate circular poison containing rods 32. The poison in these rods is a material that readily absorbs neutrons such as boron carbide ($B_4C$).

Attached between the rod drive shaft 28 and the absorber 30 is a thermally elongatable member 34 having means for amplifying its thermal elongation. The elongatable member is constructed from a plurality of coaxial cylinders 36 of differing radii. Each cylinder has a principal axis that is oriented parallel to the direction of motion of the rod drive shaft 28 and the absorber 30.

The cylinders 36 are submerged in the primary coolant and have a plurality of ports 38 to which permit the primary coolant to flow between the cylinders and cause a variation in length directly corresponding to the variation in primary coolant temperature. The thermally elongatable member 34 amplifies its thermal elongation by incorporating cylinders having differing coefficients of linear thermal expansion and attaching the cylinders together at their ends in an alternating manner. In FIG. 2 the cylinders identified by reference numeral 36 are fabricated from a material having a large coefficient of expansion ($\alpha 1$), and the remaining cylinders 36' are fabricated from a material having a small coefficient of linear expansion ($\alpha 2$).

Referring to FIG. 2, the innermost cylinder 36 is fabricated from the material having the larger coefficient of expansion ($\alpha 1$) and is attached at its top end to the rod drive shaft 28. This innermost cylinder, in turn, is attached at its lower end of the next larger cylinder 36' which is fabricated from the material having the smaller coefficient of expansion ($\alpha 2$). This second cylinder is attached to the next larger cylinder 36 at its upper end near the attachment point of the innermost cylinder to the rod drive shaft 28. The successively larger cylinders alternate in sequence back and forth between the larger and smaller coefficients of thermal expansion and between the top and bottom points of attachment. This variation is illustrated in FIG. 2.

In the preferred embodiment the cylinders 36 having the larger coefficient of thermal expansion ($\alpha 1$) are fabricated from stainless steel and the cylinders 36' having the smaller coefficient of thermal expansion ($\alpha 2$) are fabricated from Invar. Stainless steel has the coefficient of linear thermal expansion of $10-12 \times 10^{-6}$ increase in length per unit of length per degree C. Invar has a coefficient of linear thermal expansion of about $0.9 \times 10^{-6}$ increase in length per unit of length per degree C.

The amplifying effect of the thermally elongatable member 34 is mathematically described by assuming that the cylinders 36 all have a length L. The series of cylinders 36 have a large coefficient of expansion ($\alpha 1$) and the cylinders 36' have a smaller coefficient of expansion ($\alpha 2$). It can be shown that for N cylinders 36 of material $\alpha 1$ and $N-1$ cylinders 36' of material $\alpha 2$ the overall elongation of the member $\Delta L$ is given by:

$$\Delta L = [N(\alpha_1 - \alpha_2) + \alpha_2]L\Delta T$$

where
$\alpha_1 >> \alpha_2$
and $\Delta T$ is the change in temperature.

It should be appreciated that the thermal elongation amplifier 34, FIG. 2, is comparable in some respects to systems for compensating pendulums in order to maintain a uniform period. For example, the pendulums used in some late 19th century grandfather clocks incorporate mechanical devices to compensate for changes in ambient temperature. These devices move a counter weight along the principal axis of the supporting arm of the pendulum and compensate for the variation in length of the supporting arm due to changes in the ambient temperature. These pendulum compensating devices typically include a mechanical yoke and two sets of parallel rods each having a different coefficient of thermal expansion. The yoke alternatively engages rods in each set so that a thermal elongation amplifier is formed.

In operation, the control rod 12 is installed in a nuclear reactor as illustrated in FIG. 1. The thermal elongation amplifier 34 is exposed to the temperature of the primary coolant leaving the reactor and is positioned in the reactor at a level below the sodium outlet nozzle 22. Depending on the amount of negative reactivity which is required to overcome a temperature excursion, the thermal elongation amplifier 34 and the absorber 30 are installed on one or a plurality of the control rods. It should also be noted that the elongation amplifier and the absorber need not be installed on a control rod at all but can be attached to a structural component of the reactor vessel 16. All that is required is positioning the components so that the absorber can move relative to the core as the temperature of the primary coolant varies.

In the operation of a nuclear reactor the control rods 12 including the neutron absorbers attached thereto are positioned with respect to the reactor 8, FIG. 2, in a manner to precisely control the growth of the neutron population within the reactor. Typically during start-up the absorbers 30 are partially withdrawn individually and in groups and the fully inserted position in the reactor core. As the temperature of the primary coolant increases, the reactivity in the reactor decreases as a result of the negative temperature coefficient. To compensate for this increase in negative reactivity, the control rods are withdrawn slightly from the core by the rod drive mechanism 14. As a reactor is brought on the line and commences to provide power, the control rods are withdrawn further from the core. When the reactor is operating at full power, some of the control rods 12 are fully withdrawn from the core and others remain partially inserted. Those control rods having a thermal elongation amplifier 34 connected between the rod drive shaft 28 and the absorber 30 are operated in the same manner as those control rods that do not.

A loss of coolant flow can occur, for example, from either a rupture in the primary system piping, the stoppage of a main circulating pump (not shown), or the closure of a valve (not shown) in the primary coolant main circulating loop. The primary coolant then ceases to carry away the heat generated by the reactor. Since the reactor continues to generate heat at substantially the same level of power as before the loss of flow, the temperature of the primary coolant commences a thermal excursion.

The increase in temperature of the primary coolant causes the thermal elongation amplifier 34 to increase in length and to move the absorber 30 into closer proximity with the core 8 of the reactor. The absorber moves downward relative to the rod drive shaft 28 which remains stationary unless moved by the rod drive mechanism 14. This motion of the absorber causes it to absorb more of the neutrons in the reactor and to correspondingly reduce the level of power. The motion of the absorber into the core is directly proportional to the increase in temperature.

The thermal elongation amplifier 34, FIG. 2, is placed in intimate thermal communication with the primary coolant and is sensitive to the temperature of the primary coolant at the point where the coolant leaves the reactor. The elongation amplifier has a plurality of ports 38 that permit a substantially unrestricted flow of primary coolant around the cylinders 36, 36'. As the primary coolant coasts down after the loss of flow, the primary coolant transfers its heat to the elongation amplifier by convection. When the flow of primary coolant essentially stops, the cylinders 36, 36' in the amplifier are heated either by conduction or natural convection.

Typically, in a loss of flow accident the sensing devices and scram mechanisms immediately terminate the temperature transient and the reactor is shut down without a significant increase in overall power or temperature. However, the present invention provides additional security because in the event of the failure of all reactor sensors, actuation mechanisms and power supplies, the reactor will be shut down by the insertion of the absorber 30 into the reactor by the thermal elongation amplifier 34.

It should be noted that in some reactors it may not be necessary for the absorber 30 to be inserted completely into the core. In these reactors it is sufficient that the level of power in the reactor be reduced to a low steady-state level of less than 15 percent of full power. At this power level the heat load can be removed by natural convection of the coolant and dissipated by a small, emergency cooling heat sink.

The present invention has special application in a liquid metal fast breeder reactor because the reactor normally has either a very small negative temperature coefficient of reactivity or a slightly positive coefficient. The thermal elongation amplifier 34 in combination with the absorber 30, in effect, provides a negative temperature coefficient of reactivity and stablizes the reactor during operation. The operation of the breeder reactor becomes self-correcting because the absorber is moved closer to the core and inserts negative reactivity as the temperature of the primary coolant increases.

It should also be noted that this device provides a means for minimizing temperature excursions and for terminating over-power transients without having to shut down the reactor. The transient can be overcome without a scram and the reactor can remain on the line producing power.

Referring to FIGS. 4 and 5 the elongate members are a plurality of parallel rods 40, 40' that are connected by a mechanical yoke 42 so that thermal expansion of the members is amplified in the direction of relative motion. Each rod has a principal axis oriented parallel to the direction of relative motion.

Although the preferred embodiment has been described in use in a liquid metal fast breeder reactor, this invention contemplates application in other reactors such as pressurized water reactors, gas cooled reactors, and boiling water reactors. In addition, the absorber 30 need not be boron carbide but can be any neutron-absorbing material.

The present invention also contemplates locating the thermal elongation amplifier 34, FIG. 2, in other locations in the reactor besides in a position to monitor the exiting primary coolant. For example, the amplifier can be positioned in the reactor to sense the incoming primary coolant and in the bottom of the reactor to sense the temperature of the primary coolant below the core.

Thus, although the best modes contemplated for carrying out the present invention have been herein shown and described, it will be apparent that modification and variation may be made without departing from what is regarded as the subject matter of the invention.

What is claimed is:

1. Apparatus for controlling the power level in a nuclear reactor, said reactor having a core that is cooled during normal operation by a flow of primary coolant, comprising:
   (a) an elongate absorber support shaft adapted for relative motion with respect to the core of a nuclear reactor;
   (b) an elongate absorber member for absorbing neutrons in the nuclear reactor, said member being adapted for relative motion with respect to the core of the reactor; and
   (c) a plurality of high coefficient thermal expansion members and a corresponding plurality of low coefficient thermal expansion members disposed in alternate relationship and connected in series alternately at their top ends and at their bottom ends, said expansion members being elongate and attached at one end of the alternating series to the absorber support shaft and at the other end of the series to the absorber member so that the absorber support shaft, absorber member, and thermal expansion members all have longitudinal axes oriented in a direction generally parallel to the direction of relative motion between the absorber member and the core and together form an elongate in-line structure, the absorber member being moved relative to the core by the motion of the absorber support shaft and by thermal elongation of the expansion members, the absorber member being movable by thermal elongation relative to the absorber support shaft into closer proximity with the core as the temperature of the core increases, said thermal expansion members being in thermal communication with the core and responsive to the temperature thereof.

2. Apparatus as in claim 1 in which the thermal expansion members are a plurality of coaxial cylinders of differing radii and are attached together in an alternating manner, each cylinder having a principal axis oriented parallel to the direction of relative motion and co-incident with the longitudinal axis of the absorber support shaft.

3. Apparatus as in claim 1 in which the thermal expansion members are a plurality of parallel rods that are connected by a mechanical yoke so that thermal expansion of the members is amplified in the direction of relative motion, each rod having a principal axis oriented parallel to the direction of relative motion.

4. Apparatus as in claim 1 in which the nuclear reactor is a liquid metal fast breeder reactor and the plurality of high and low coefficient thermal expansion members provides a negative temperature coefficient of reactivity to said reactor so that the rate at which neutrons are absorbed increases proportionally as the temperature of the liquid metal primary coolant increases and the power level is correspondingly decreased.

5. Method for controlling the power level in a nuclear reactor, said reactor having a core that is cooled during normal operation by a flow of primary coolant, comprising the steps of:
(a) supporting a neutron absorber member in a nuclear reactor for absorbing neutrons therein using a control rod drive shaft and a plurality of alternately connected members having high coefficients and low coefficients of thermal expansion;
(b) controlling the power level in the reactor on command by relatively moving the neutron absorber member with respect to the core using a rod drive motor to move the rod drive shaft and the thermal expansion members; and
(c) moving the neutron absorber member with respect to the rod drive shaft and in turn with respect to the core in a manner responsive to the reactor core temperature by using the thermal expansion properties of the thermal expansion members and controlling the power level in the reactor using the absorber member independently of and in addition to the motion of the rod drive shaft so that as the core temperature increases, the power level is correspondingly decreased.

* * * * *